United States Patent
Kubota

(10) Patent No.: US 7,287,098 B2
(45) Date of Patent: Oct. 23, 2007

(54) CONTROL METHOD AND ELECTRONIC DEVICE ENABLING RECOGNITION OF FUNCTIONS INSTALLED IN THE ELECTRONIC DEVICE

(75) Inventor: Yoshiyasu Kubota, Kanagawa (JP)

(73) Assignee: Sony Corporation (JP)

( * ) Notice: Subject to any disclaimer, the term of this patent is extended or adjusted under 35 U.S.C. 154(b) by 4 days.

(21) Appl. No.: 09/834,025

(22) Filed: Apr. 12, 2001

(65) Prior Publication Data

US 2002/0004864 A1 Jan. 10, 2002

(30) Foreign Application Priority Data

Apr. 12, 2000 (JP) .......................... P2000-111030
Mar. 2, 2001 (JP) .......................... P2001-058598

(51) Int. Cl.
*G06F 3/00* (2006.01)
*G06F 13/00* (2006.01)

(52) U.S. Cl. .................. 710/5; 710/6; 710/15; 710/16; 710/36

(58) Field of Classification Search ............... 710/5, 710/13, 8, 6, 15, 16, 36; 711/115; 358/1.15; 235/380, 382

See application file for complete search history.

(56) References Cited

U.S. PATENT DOCUMENTS 5,901,303 A * 5/1999 Chew .................. 711/115
5,923,884 A * 7/1999 Peyret et al. ............... 235/382
6,164,549 A * 12/2000 Richards ..................... 235/380
6,574,677 B1 * 6/2003 Song et al. ................... 710/8
6,606,161 B2 * 8/2003 Murata ...................... 358/1.15
6,698,654 B1 * 3/2004 Zuppicich .................. 235/380
6,901,299 B1 * 5/2005 Whitehead et al. ........... 700/22

FOREIGN PATENT DOCUMENTS

EP 0 936 540 A2 8/1999
EP 1 102 164 A2 5/2001
GB 2 343 269 A 5/2000

* cited by examiner

Primary Examiner—Kim Huynh
Assistant Examiner—Joshua D. Schneider
(74) Attorney, Agent, or Firm—Lerner, David, Littenberg, Krumholz & Mentlik, LLP

(57) ABSTRACT

An electronic device includes a serial interface which exchanges data with a memory register and a first data buffer. In accordance with a setting which is written in the memory register, data in the first data buffer is exchanged with a memory through a memory controller. The serial interface exchanges data with an add-on register and a second data buffer. In accordance with a setting which is written in the add-on register, data in the second data buffer is exchanged with an add-on unit through an add-on controller. The add-on unit is connected to an external LAN or the like. Part of the setting data written in the memory register and the add-on register is determined from the add-on unit by a system control circuit. In accordance with the determination, a function to be executed by the electronic device is changed.

17 Claims, 5 Drawing Sheets

FIG. 3

| ADDRESS | READ REGISTER | WRITE REGISTER |
|---|---|---|
| 00 | | |
| 01 | INTERRUPT | |
| 02 | STATUS 0 | |
| 03 | STATUS 1 | |
| 04 | TYPE | TYPE |
| 05 | | |
| 06 | CATEGORY | CATEGORY |
| 07 | CLASS | |
| 08 | | |
| 09 | UNDEFINED | UNDEFINED |
| ⋮ | ⋮ | ⋮ |
| 0F | UNDEFINED | |
| 10 | | SYSTEM PARAMETER |
| 11 | | BLOCK ADDRESS 2 |
| 12 | | BLOCK ADDRESS 1 |
| 13 | | BLOCK ADDRESS 0 |
| 14 | | COMMAND PARAMETER |
| 15 | PAGE ADDRESS | PAGE ADDRESS |
| 16 | BLOCK FLAG DATA | BLOCK FLAG DATA |
| 17 | BLOCK INFORMATION | BLOCK INFORMATION |
| 18 | LOGICAL ADDRESS 1 | LOGICAL ADDRESS 1 |
| 19 | LOGICAL ADDRESS 0 | LOGICAL ADDRESS 0 |
| 1A | FORMULATING FORMAT | FORMULATING FORMAT |
| ⋮ | ⋮ | ⋮ |
| 1E | FORMULATING FORMAT | FORMULATING FORMAT |
| 1F | | |
| 20 | | |
| ⋮ | ⋮ | ⋮ |
| FF | | |

| CATEGORY NO. | FUNCTION | CLASS |
|---|---|---|
| 00 | MEMORY DEVICE | 00 |
| 01 | INFORMATION DEVICE | 01 ~ |
| 02 | LAN CONNECTING DEVICE | 01 ~ |
| 03 | COMMUNICATION | 01 ~ |
| 04 | BLUETOOTH | 01 ~ |
| ⋮ | ⋮ | |

FIG. 6

| NUMBER OF BYTES | CONTENTS |
|---|---|
| 4 | DISABLED BLOCK DATA START POSITION |
| 4 | DATA SIZE |
| 1 | DISABLED BLOCK DATA ID |
| 3 | UNDEFINED |
| 4 | CIS/IDI DATA START POSITION |
| 4 | DATA SIZE |
| 1 | CIS/IDI DATA ID |
| 3 | UNDEFINED |
| 4 | FUNCTION LIST DATA START POSITION |
| 4 | DATA SIZE |
| 1 | FUNCTION LIST DATA ID |
| 3 | UNDEFINED |
| 12 | UNDEFINED |

FIG. 7

| CATEGORY NO. (FUNCTION) | CORRESPONDING CLASS NO. |
|---|---|
| 02 (LAN CONNECTING DEVICE) | 01 |
| 04 (BLUETOOTH) | 01 |
| . . . | . . . |
| . . . | . . . |

CONTROL METHOD AND ELECTRONIC DEVICE ENABLING RECOGNITION OF FUNCTIONS INSTALLED IN THE ELECTRONIC DEVICE

CROSS-REFERENCE TO RELATED APPLICATIONS

The present invention claims priority from Japanese Application Nos. P2000-111030 filed Apr. 12, 2000 and P2001-058598 filed Mar. 2, 2001, the disclosures of which are hereby incorporated by reference herein.

BACKGROUND OF THE INVENTION

The present invention relates to control methods and electronic devices suitable for being used as, for example, devices which are removably provided with respect to a main unit in order to perform arbitrary functions. More particularly, the present invention relates to a control method and to an electronic device which has an equivalent shape to a memory card or a similar semiconductor memory and which is connected to the memory connecting section of the main unit in order to perform arbitrary functions.

For example, an electronic device may have an equivalent shape to a memory card which is removable from a main unit or to a similar semiconductor memory. The electronic device is connected to the memory connecting section of the main unit in order to perform arbitrary functions. Specifically, such an electronic device adds on a connecting function for a computer network or a communication function. In this way, the electronic device easily enhances the operation and application of the main unit.

If the main unit does not recognize a function to be performed by the electronic device, inappropriate data may be transmitted and, hence, erroneous processing may be performed. At the main unit side, a malfunction may result. When the main unit requests a function not installed in the electronic device, that function cannot be executed and, as a result, the main unit may go down. Also, it may require time and a complicated procedure to restore the main unit to its original state.

The problems with the conventional electronic device include erroneous processing and main unit malfunctions caused by the inability of the main unit to recognize a function to be executed by the electronic device. When a function is not executed, the main unit may go down, and it may require time and a complicated procedure to restore the main unit to its original state.

SUMMARY OF THE INVENTION

Accordingly, it is an object of the present invention to provide, in a register for performing setting, a write area in which the code of a function requested by a main unit is written, and a read area in which the code of a function selected in an electronic device and the code associated therewith are read. Accordingly, it is possible to enable a main unit to recognize a function executed by the electronic device by using a simple method, and hence a desired function can be reliably executed. Thus, the main unit can reliably enable a desired function.

According to an aspect of the present invention, a control method for a main unit and an electronic device removably connected thereto is provided. The method includes providing a register in the electronic device, the register having a write area and a read area and performing setting when a function is executed. The code of a function requested by the main unit is written in the write area of the register. The code of a function to be executed and the code associated therewith are read in the read area of the register.

According to another aspect of the present invention, an electronic device is provided which is removably connected to a main unit for exchanging arbitrary data with the main unit and for executing a plurality of functions. The electronic device includes a register for performing setting when ones of the plurality of functions are executed. The register includes a write area in which the code of a function requested by the main unit is written, and a read area in which the code of a function selected in the electronic device and the code associated therewith are read.

According to the present invention, it is possible to enable a main unit to recognize a function to be executed by an electronic device, and hence a desired function is reliably executed by using a simple method. The main unit can reliably enable a desired function. Also, the main unit can easily recognize a function installed in the electronic device. It is therefore possible to prevent unnecessary operations and malfunctions such as the activation of an unexecutable function. Even when a list of functions is not provided, it is still possible to prevent unnecessary operations and malfunctions such as the activation of an unexecutable function. As a result, the present invention can solve problems encountered with a conventional electronic device. Such problems include erroneous processing and main unit malfunctions due to the main unit's inability to recognize a function to be executed by the electronic device, which may require time and a complicated procedure to restore the main unit to its original state.

BRIEF DESCRIPTION OF THE DRAWINGS

FIG. 3 is a diagram illustrating an example of the memory register of the electronic device;

FIG. 6 is a diagram illustrating an example of the system entry area of the electronic device; and FIG. 7 is a diagram illustrating the function list data of the electronic device.

DETAILED DESCRIPTION

Figure 1:
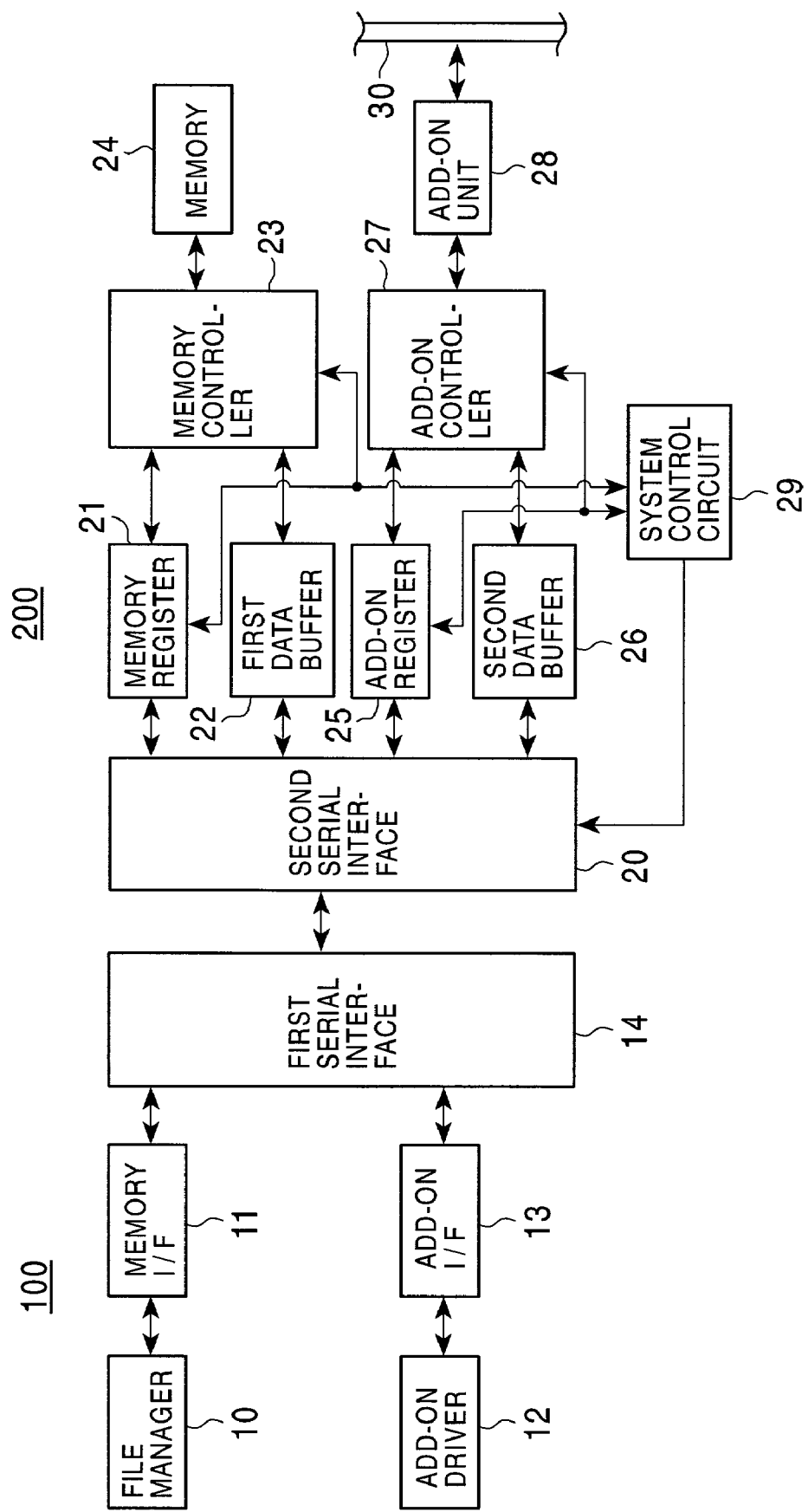
FIG. 1 is a block diagram of an electronic device and a main unit according to an embodiment of the present invention.

The present invention will become apparent from the following description of the preferred embodiment with reference to the accompanying drawings. FIG. 1 is a block diagram of an electronic device and a main unit according to an embodiment of the present invention.

Referring to FIG. 1, a main unit 100 is illustrated at the left of the block diagram. A data file stored in a memory device (not shown) or the like provided in the main unit 100 is exchanged with a memory interface (I/F) 11 through a file manager 10. An add-on driver 12 is provided for performing an arbitrary extended function. Data in the add-on driver 12 is exchanged with an add-on interface 13. Data in the memory interface 11 and the add-on interface 13 is exchanged with a first serial interface 14.

Figure 2:
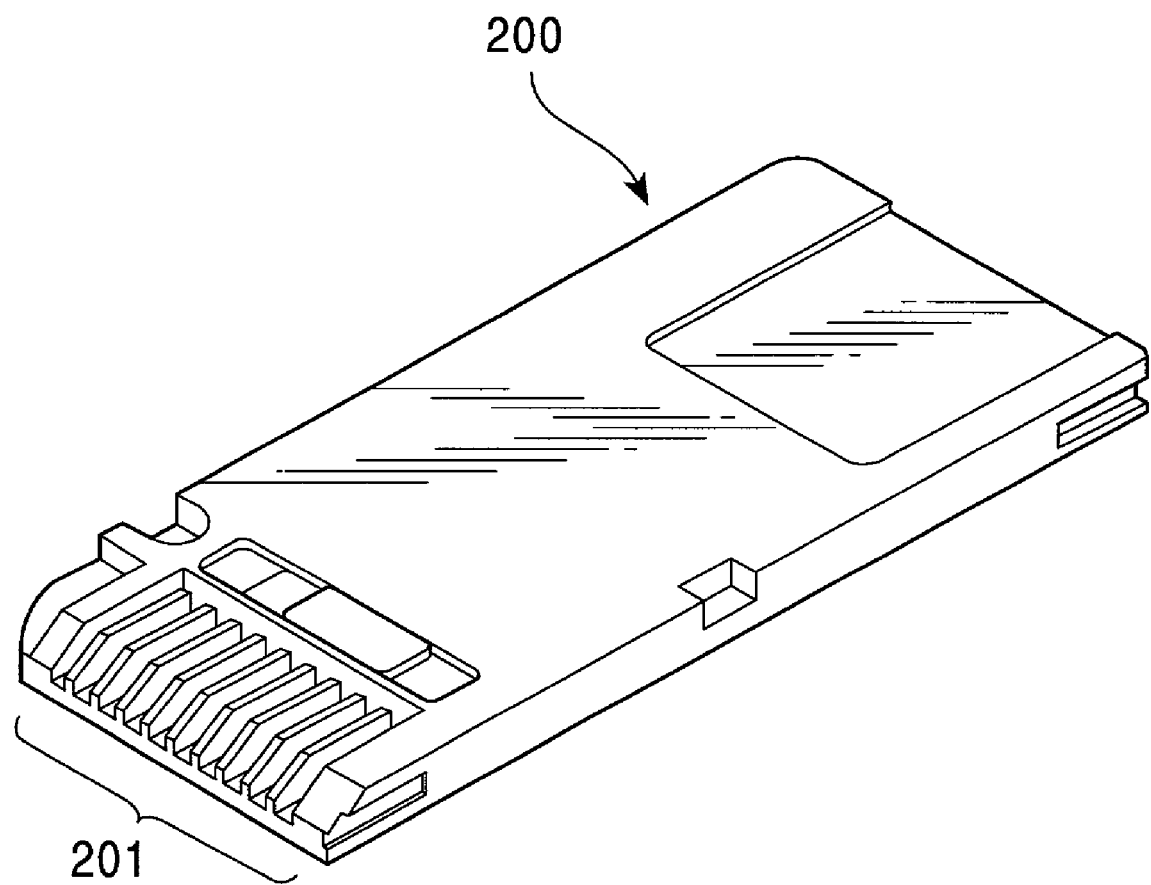
FIG. 2 is an external view of an electronic device according to an embodiment of the present invention.

At the right of the block diagram, an electronic device 200 is shown. Referring to FIG. 2, for example, the electronic device 200 has an equivalent shape to a so-called memory card or a semiconductor memory similar to the memory card. The electronic device 200 is removably provided with respect to the main unit 100. The electronic device 200 is electrically connected to the main unit 100 through a contact group 201 provided at the end of the electronic device 200. Thus, data can be exchanged between the main unit 100 and the electronic device 200.

Specifically, referring back to FIG. 1, data is exchanged between a second serial interface 20 provided in the electronic device 200 and the first serial interface 14 provided in the main unit 100. In a conventional memory, the second serial interface 20 exchanges data with a memory register 21 and a first data buffer 22. In accordance with a setting which is written in the memory register 21, data in the first data buffer 22 is exchanged with a memory 24 through a memory controller 23.

When performing an extended function, the second serial interface 20 exchanges data with an add-on register 25 and a second data buffer 26. In accordance with a setting which is written in the add-on register 25, data in the second data buffer 26 is exchanged with an add-on unit 28 through an add-on controller 27. The add-on unit 28 is connected to an external local area network (LAN) 30 or the like in accordance with an arbitrary connection procedure (protocol).

Part of the setting data written in the memory register 21 and the add-on register 25 is determined from the add-on unit 28 by a system control circuit 29. In accordance with the determination, a function to be executed by the electronic device 200 is changed. Specifically, in accordance with the determination, for example, the system control circuit 29 supplies a control signal for driving the memory controller 23 or the add-on controller 27. At the same time, the function being executed using the memory register 21 or the add-on register 25 is reported.

FIG. 3 shows an example of the structure of the memory register 21. As shown in FIG. 3, the memory register 21 includes addresses "00" to "1F" (where "--" represents a hexadecimal value). Each address includes a 2-byte read register and a 2-byte write register. Information in the electronic device 200 is read into the read register, whereas information from the main unit 100 is written in the write register.

For example, the address "00" in the memory register 21 is unused. The read register at the address "01" is an interrupt register. The read registers at the addresses "02" and "03" are status 0 and 1 registers, respectively. The write registers at the addresses "01" to "03" are unused. The read register and the write register at the address "04" are type registers. The address "05" is unused.

The read register and the write register at the address "06" are category number registers. The read register at the address "07" is a class number register. The write register at the address "07" is unused. The address "08" is unused. The read registers and the write registers at the addresses "09" to "0E" are undefined. The read register at the address "0F" is undefined, and the write register at the address "0F" is unused.

The write register at the address "10" is a system parameter register. The write registers at the addresses "11" to "13" are registers for block addresses 2 to 0, respectively. The write register at the address "14" is a command parameter register. The read registers at the addresses "10" to "14" are unused. The read register and the write register at the address "15" are page address registers.

The read register and the write register at the address "16" are registers for block flag data. The read register and the write register at the address "17" are block information registers. The read registers and the write registers at the addresses "18" and "19" are registers for logical addresses 1 and 0, respectively. Each of the addresses from "1A" to "1E" is for formulating a format. The address "1F" is unused.

In order for the main unit 100 to change a function to be executed by the electronic device 200, the code (category number) of a desired function is written in the write register at the address "06". The system control circuit 29 reads the code (category number) of the function from the write register and, hence, the function requested by the main unit 100 is detected by the electronic device 200.

In order for the electronic device 200 to execute the detected function, for example, the system control circuit 29 generates a control signal for driving the memory controller 23 or the add-on controller 27. The control signal generated by the system control circuit 29 is supplied to the memory controller 23 or the add-on controller 27 and, as a result, the function requested by the main unit 100 is executed by the electronic device 200.

The code (category number) of the function to be executed by the electronic device 200 is read in the read register at the address "06". At the same time, a class number for indicating a version, which is associated with the function executed by the electronic device 200, is read in the read register at the address "07". The main unit 100 determines the category number and the class number, and therefore recognizes the function to be executed by the electronic device 200. The add-on driver 12 which corresponds to the recognized function is activated.

In this way, the code (category number) of the desired function is written by the main unit 100 in the write register at the address "06", and hence the function to be executed by the electronic device 200 is changed. The code (category number) of the function to be executed by the electronic device 200 is read in the read register at the address "06", and hence the function to be executed by the electronic device 200 is recognized by the main unit 100. Thus, the changing of the function is smoothly performed.

Specifically, when the function written by the main unit 100 in the write register at the address "06" is not installed in the electronic device 200, the code (category number) of the function is not read in the read register at the address "06". Thus, the main unit 100 recognizes that the desired function is not installed in the electronic device 200. Accordingly, the main unit 100 can smoothly perform processing such as cancellation of the execution of the function.

For example, common addresses are set in the memory register 21 and the add-on register 25. At the same time, registers in accordance with the respective functions are enabled by bank switching or the like. In this case, the contents of the registers are changed in accordance with each function. However, the type register at the address "04", the category number register at the address "06", and the class number in the read register at the address "07" are common to all functions.

The addresses "00" to "FF" can be provided for these registers as a whole. For example, the memory register 21 is provided at the addresses "00" to "1F", and the add-on register 25 is provided at the addresses "20" to "3F". By controlling high-order bits of these addresses, the changing of the register can be performed. In this case, high-order bits of the addresses "04", "06", and "07" are ignored, and hence these addresses can be shared among all functions.

According to this embodiment, a predetermined section of a register for performing setting is provided with a write area in which the code of a function requested by a main unit is written, and a read area in which the code of a function selected in an electronic device and a code associated therewith are read. In this way, the main unit can recognize a function executed by the electronic device by using a simple method. Hence, a desired function can be reliably executed, and the main unit can reliably enable a desired function.

In a conventional electronic device, erroneous processing and main unit malfunctions result from the inability of the main unit to recognize the function executed by the electronic device. When a function is not executed, the main unit may go down, and it may require a complicated procedure and time to restore the main unit to its original state.

Figures 4, 5:
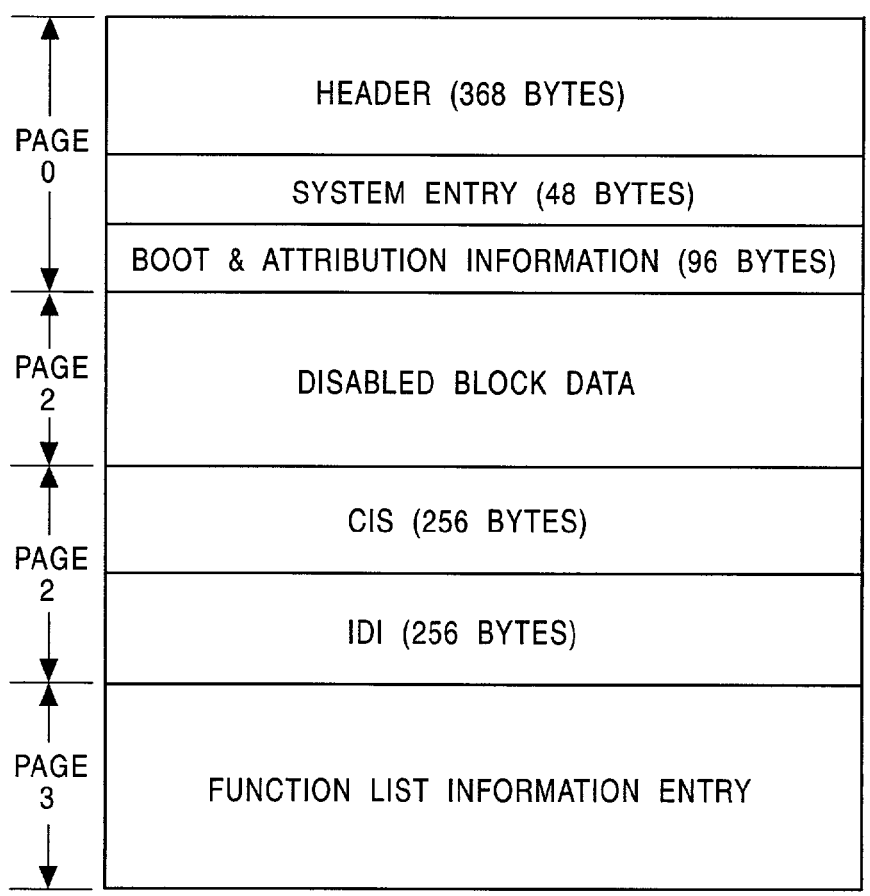
FIG. 4 is a diagram illustrating an example of the category and class addresses of the electronic device.
FIG. 5 is a diagram illustrating an example of the boot block format of the memory of the electronic device.

FIG. 4 shows an example of a manner in which the code (category number) of a function used at the address "06" and the class number used at the address "07" are defined in this embodiment. Specifically, referring to FIG. 4, the category number "00" represents the function of a memory. In this case, the class number only has the value "00". Since the addresses "06" and "07" in a conventional memory are unused, the value "00" is assigned to each of these addresses.

In contrast, a new category number "01" represents the function of an information device. A category number "02" represents the function of a LAN (Ethernet) connecting device or the like. A category number "03" represents the function of a communication device. A category number "04" represents the function of a communication device (Bluetooth) which is defined by manufactures in Japan, the United States, and Europe as a common standard. To each of these functions, a class number from the value "01" onward is assigned.

In addition to the above-described functions, the electronic device 200 may include other functions such as a camera function, a display function, a global positioning system (GPS) function, and a serial communication function.

For example, functions installed in the electronic device 200 can be listed in the numerical order of their category numbers and class numbers, and the list can be provided in the electronic device 200. It is therefore possible to enable the main unit 100 to recognize in advance the function to be executed by the electronic device 200 and to prevent unnecessary operations and malfunctions of the main unit 100. To this end, when the electronic device 200 has a memory function, the above list of functions may be installed in the memory of the electronic device 200.

Specifically, when the electronic device 200 has a memory function, a boot block format of the memory is shown in FIG. 5.

Referring to FIG. 5, page 0 consists of a 368-byte header, a 48-byte system entry, and a 96-byte boot & attribute information. Page 1 includes disabled block data. Page 2 includes a 256-byte card information structure (CIS) and a 256-byte identity drive information (IDI). Page 3 includes a function list information entry in which a list of installed functions is recorded.

The header on page 0 includes information such as the block ID, a format version, and the number of entries. As shown in FIG. 6, the system entry includes information concerning data from page 1 onward. Specifically, a start position for the disabled block data is provided in the first 4 bytes of the system entry. In the next 4 bytes, the data size of the disabled block data is provided. In the next 1 byte, the ID of the disabled block data is provided. The next 3 bytes are undefined.

Definitions of the CIS/IDI data are provided in the next 12 bytes of the system entry, in the same manner as the information concerning the disabled block data. Specifically, a start position for the CIS/IDI data is provided in the first 4 bytes of the 12 bytes. In the next 4 bytes, the data size of the CIS/IDI data is provided. In the next 1 byte, the ID of the CIS/IDI data is provided. The next 3 bytes are undefined.

In the subsequent 12 bytes, data concerning the function list information entry is provided. Specifically, a start position for the function list data is provided in first 4 bytes of the 12 bytes. In the next 4 bytes, the data size of the function list data is provided. In the next 1 byte, the ID of the function list data is provided. The next 3 bytes are undefined. In addition, the next 12 bytes are undefined. In this manner, definitions of the function list data are provided in the system entry area.

At an address (page 3) of the memory in accordance with the function list data definitions, function list data such as shown in FIG. 7 is provided. Specifically, in the function list data, a category number indicating an installed function and a class number corresponding to the category number are provided. FIG. 7 shows a case in which the function of a LAN (Ethernet) connecting device and the function of a communication device (Bluetooth) are provided.

Thus, in the category number section, "02" indicating the function of the LAN (Ethernet) connecting device and "04" indicating the function of the communication device (Bluetooth) are provided. In the corresponding class number sections, "01" is provided. The category number and the class number each consist of 1 byte. The data size of the function list data in the system entry area is obtained by 2 bytes (number of installed functions).

In order for the main unit 100 to obtain the function list data in the electronic device 200, the main unit 100 assumes that the electronic device 200 has a memory function and reads the system entry area. If reading is accomplished, it is possible to determine that the electronic device 200 at least has a memory function. In accordance with the definitions provided in the system entry area, the function list data is read. As a result, the function list data in the electronic device 200 can be obtained.

In contrast, when reading of the system entry area is not accomplished, it is determined that the electronic device 200 does not have a memory function. In this state, it is impossible to obtain the function list data. In such a case, the main unit 100 writes the category numbers one by one in the write register at the address "06". When the same category number is returned to the read register at the address "06", it is possible to determine that the function is installed in the electronic device 200.

Accordingly, the main unit 100 can recognize in advance functions installed in the electronic device 200. It is thus possible to prevent unnecessary operations and malfunctions of the main unit 100. In other words, the main unit 100 checks a recognized function installed in the electronic device 200 with a function of the main unit and determines that only matching functions are executable. Hence, it is possible to prevent unnecessary operations and malfunctions such as the activation of an unexecutable function.

The functions installed in the electronic device 200 can be recognized by having the main unit 100 write the category numbers included in the main unit 100 one by one in the write register at the address "06". A determination is then made as to whether the same category number is returned to the read register at the address "06". If the determination is affirmative, it is determined that the function is installed in the electronic device 200. Before performing necessary functions, recognition of the functions can be performed in a similar manner.

According to this embodiment, an electronic device is removably provided with respect to a main unit. The electronic device exchanges arbitrary data with the main unit and performs a plurality of functions. The electronic device has a register for performing setting when a function is executed. A predetermined section of the register is provided with a write area in which the code of a function requested by the main unit is written, and a read area in which the code of a function selected in the electronic device and the code associated therewith are read. As a result, it is possible to enable the main unit to easily recognize a function to be executed by the electronic device, and hence the main unit can reliably perform a desired function.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A control method for a main unit and an electronic device removably connected thereto, comprising:
   providing a register in the electronic device, the register having a write area and a read area for setting of codes of functions representing different types of devices and to be executed by the electronic device;
   providing an add-on register in the electronic device, the add-on register being coupled to the register through a system control circuit, the system control circuit being operable to supply a control signal for driving a memory controller connected to the register;
   writing the code of a function requested by the main unit in the write area of the register; and
   controlling, by the main unit, execution of the requested function based upon at least the code of the function read out from the read area, the step of controlling further comprising
   comparing the code of the function read out from the read area with the code of the function in the write area,
   determining that the function associated with the code written in the write area is installed in the electronic device if the comparison indicates a match, and
   determining that the function associated with the code written in the write area is not installed in the electronic device if the comparison does not indicate a match.

2. A control method according to claim 1, wherein the electronic device includes a memory, said method further comprising providing a list of the codes of the functions to be executed at a predetermined address in the memory.

3. A control method according to claim 2, further comprising accessing the predetermined address by the main unit to determine the function to be executed.

4. A control method according to claim 1, wherein said writing step includes writing the code of an arbitrary function in the write area, and said reading step includes reading the code of a function selected in the electronic device and a code associated therewith, whereby the main unit determines the function to be executed.

5. A control method according to claim 4, wherein the main unit enables the function to be executed based on the determination.

6. An electronic device removably connectable to a main unit for exchanging data with the main unit and for executing a plurality of functions, comprising:
   a register for setting codes of functions to be executed by the electronic device and representing different types of devices, the register including a write area in which the code of a function requested by the main unit is written, and a read area in which the code of a function selected in the electronic device is read and detected by the main unit to allow the main unit to enable the requested function; and
   an add-on register being coupled to the register through a system control circuit, the system control circuit being operable to supply a control signal for driving a memory controller connected to the register, and
   wherein the requested function can be executed if the code of the function written in the write area is the same as the code of the function read from the read area.

7. An electronic device according to claim 6, further including a memory, the memory including at a pre-determined location a list of the codes of the functions to be executed.

8. An electronic device according to claim 6, wherein the electronic device is adapted to enable execution of the function requested by the main unit based on a determination made by the main unit.

9. A system for enabling detection of a requested function, comprising:
   a main unit;
   an electronic device removably connectable to the main unit for exchanging data with the main unit and for executing a requested function, the electronic device comprising a register for performing setting of category numbers of functions to be executed by the electronic device and representing different types of devices, the register including a write area in which the category number of a function requested by the main unit is written, and a read area in which the category number of a function selected in the electronic device is read and detected by the main unit to control processing of the requested function by the main unit; and
   an add-on register being coupled to the register through a system control circuit, the system control circuit being operable to supply a control signal for driving a memory controller connected to the register, and
   wherein the main unit recognizes that the requested function is installed in the electronic device if the category number of the function written in the write area is the same as the category number of the function read from the read area.

10. The system according to claim 9, wherein the electronic device further comprises a memory, the memory including at a predetermined location a list of the category numbers of the functions to be executed.

11. The system according to claim 10, wherein the main unit is adapted to determine the function to be executed by accessing the predetermined location.

12. The system according to claim 9, wherein the main unit is adapted to determine the function to be executed by writing the category number of an arbitrary function in the write area, and by reading the category number of a function selected in the electronic device from the read area.

13. The system according to claim 12, wherein the main unit is adapted to enable the function to be executed based on the determination.

14. A main unit adapted to removably receive an electronic device having a register including a write area and a read area, the main unit comprising:
   an interface for removably connecting the electronic device and enabling the exchange of data between the main unit and the electronic device, the electronic device further including an add-on register being coupled to the register through a system control circuit, the system control circuit being operable to supply a control signal for driving a memory controller connected to the register, and
   wherein the main unit is adapted to write a code of a function requested by the main unit in the write area, to read a code of a function to be executed from the read area and to control execution of the requested function in the electronic device based on the read code, the codes representing functions associated with different types of devices, and
   wherein the requested function is not executed if the main unit determines from a comparison of the code written in the write area and the code read from the read area that the requested function is not installed in the electronic device.

15. The main unit, according to claim 14, wherein the electronic device has a memory, the memory including at a predetermined address a list of codes of the functions to be executed and codes associated therewith, and wherein the main unit is adapted to determine the function to be executed by accessing the predetermined address.

16. The main unit according to claim 15, further comprising an add-on driver activated upon the main unit determining the function to be executed.

17. The main unit according to claim 16, wherein the add-on driver enables the function to be executed based upon the determination.

* * * * *